Jan. 26, 1965  F. E. FULLER  3,167,676
STATOR CLAMPING STRUCTURE FOR ELECTRIC MACHINES
Filed Aug. 3, 1960

INVENTOR.
FORREST ESTOL FULLER,
BY
ATTORNEYS.

3,167,676
STATOR CLAMPING STRUCTURE FOR
ELECTRIC MACHINES
Forrest Estol Fuller, North Hampton, Ohio, assignor to
Robbins & Myers, Inc., Springfield, Ohio, a corporation
of Ohio
Filed Aug. 3, 1960, Ser. No. 47,280
4 Claims. (Cl. 310—258)

This invention relates to electric machines having a housing within which a stator is provided and it relates more particularly to a construction for clamping the stator within the housing so as to prevent movement thereof in relation to the housing.

The invention will be illustrated herein in connection with a small generator but it will be understood that the principles thereof apply equally to electric motors and allied devices so that the term "electric machine" is intended to be a broad general term inclusive of various specific devices wherein a stator is mounted within a pair of bells.

In a small motor or generator the housing may comprise a pair of end bells provided with meeting flanges by means of which the two bells are clamped together. The bells are bored so that the stator stack of laminations can snugly telescope therein. An annular shoulder is generally provided in one of the bells to locate the stack axially.

It has geenerally been found necessary to provide an arrangement for preventing rotation or axial movement of the stator stack within the housing but any such fastening means involve drilling or machining the periphery of the stator to accommodate pins, keys, through-bolts and the like. As will be understood by those skilled in the art, any notches, keyways or bolt holes provided in the stator laminations interrupt the continuity of the stack so that the magnetic performance of the stator is impaired.

With the foregoing considerations in mind, it is an object of the present invention to provide a structure in which the stator stack is clamped in position incident to assembly so that movement thereof in relation to the housing is prevented. This and other objects of the invention which will be described in more detail hereinafter are accomplished by that certain construction and arrangement of parts of which the following is a detailed description.

Reference is made to the drawings forming a part hereof and in which.

Briefly, in the practice of the invention, an O-ring of rubber or rubber-like material having an inside diameter to embrace snugly the stator is provided and the bells are provided with a chamfer on the inside of each of the meeting edges thereof. The proportions of the chamfers are such in relation to the thickness of the O-ring that when the bells are assembled with the stator and the bells are telescoped toward each other until the chamfers are just tangent with the O-ring, the bells will not be in contact with each other; thereby when the bells are clamped tightly together, the O-ring is compressed and distorted so as to exert an annular clamping pressure against the stator over a substantial annular area.

Figure 1:
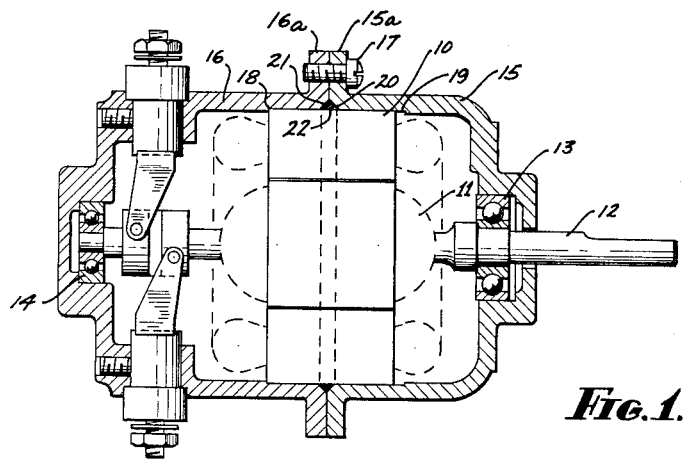
FIGURE 1 is a vertical cross-sectional view through a typical small generator showing the invention.

Referring now to the drawing, FIGURE 1 generally shows a typical small generator having a stator 10 and an armature or rotor 11. The rotor is provided with a shaft 12 and it has bearings at 13 and 14 in the end bells 15 and 16. The details of the motor construction which do not have to do with the present invention will not be described since they do not form a part of the present invention and are well known in the art.

In such small motors and generators and the like, the bells are often provided with meeting annular flanges as at 15a and 16a and the two bells are assembled together by means of screws 17 or bolts or other devices for drawing them together. Sometimes one of the bells will be provided with an annular abutment as at 18 for locating the stator axially for assembly. The other bell will generally also have an annular abutment 19 but the latter is not intended to abut the stator in assembled condition because it might wrap or distort the stator if it did.

According to the present invention, the bells 15 and 16 are chamfered on their meeting inner edges as at 20 and 21 and an O-ring is provided at 22.

Figure 2:
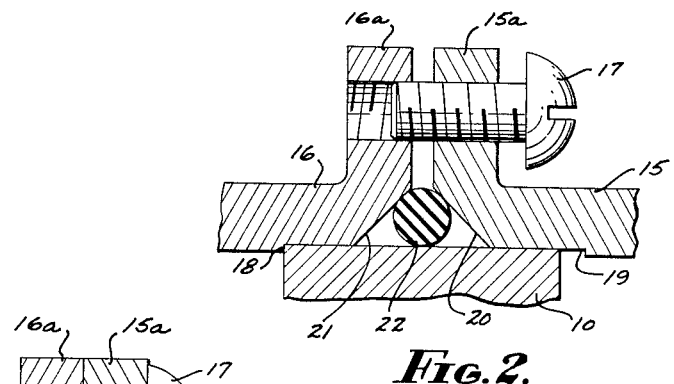
FIGURE 2 is a greatly enlarged fragmentary view showing the details of the invention.

As best seen in FIGURE 2, the O-ring in free condition snugly embraces the stator 10 and its thickness is such in relation to the chamfers 20 and 21 that when the parts are telescoped together until the chamfers 20 and 21 are just tangent to the O-ring 22, the flanges 15a and 16a will be out of contact with each other.

As shown, the chamfers are preferably disposed at a 45° angle and in the condition of FIGURE 2 the spacing between the flanges is from about one-third to about one-half the thickness of the O-ring.

Figure 3:
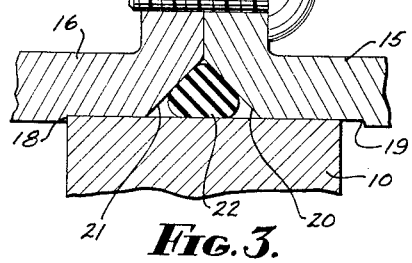
FIGURE 3 is a view similar to FIGURE 2 showing the bells in fully assembled condition.

With the parts in the condition of FIGURE 2, as the screws 17 are now tightened to bring the opposed flanges 15a and 16a into contact, the O-ring is compressed and distorted as shown in FIGURE 3 whereby to present a relatively wide area under pressure against the stator 10. This pressure effectively prevents movement of the stator with respect to the housing.

It will be understood that the description above has been intended to be illustrative only and that modifications of detail may be made without departing from the spirit of the invention.

What is claimed is:

1. In an electric machine having a housing comprising a pair of end bells having mutually opposed edges and provided with means for clamping them together, and a stator fitting snugly within said housing; means to prevent movement of said stator within said housing, comprising an O-ring snugly encircling said stator, and a chamfer on the inside of each of said mutually opposed edges of said bells, said chamfers, when said end bells are clamped together, forming a triangular space less than the diameter of said O-ring, such that when said stator is disposed within said bells, and said bells are telescoped toward each other until said chamfers are just tangent to said O-ring, said bells are out of contact with each other, whereby when said bells are clamped together in abutting contact, said O-ring is compressed and exerts a radially inward clamping pressure against said stator.

2. The structure of claim 1, wherein said chamfers have an angularity of about 45°.

3. The structure of claim 1, wherein the space between said bells when said chamfers are just tangent to said O-ring is between about one-third and about one-half the thickness of said O-ring.

4. The structure of claim 1, wherein one of said bells is provided with an annular stator locating abutment.

References Cited by the Examiner
UNITED STATES PATENTS

| | | | |
|---|---|---|---|
| 1,688,891 | 10/28 | Spreen | 310—258 |
| 2,643,351 | 6/53 | Feiertag | 310—258 |
| 2,670,447 | 2/54 | Harmon | 310—89 X |
| 2,720,601 | 10/55 | Dean | 310—89 |
| 2,941,098 | 6/60 | Thompson | 310—89 X |

MILTON O. HIRSHFIELD, *Primary Examiner.*

DAVID X. SLINEY, *Examiner.*